United States Patent
Choi

(10) Patent No.: US 9,061,577 B2
(45) Date of Patent: Jun. 23, 2015

(54) DRIVING DEVICE FOR REAR WHEELS OF FOUR WHEEL DRIVING ELECTRIC VEHICLE

(71) Applicant: Hyundai Wia Corporation, Gyeongsangnam-do (KR)

(72) Inventor: Hong Kyu Choi, Gyeonggi-do (KR)

(73) Assignee: Hyundai Wia Corporation (KR)

( * ) Notice: Subject to any disclaimer, the term of this patent is extended or adjusted under 35 U.S.C. 154(b) by 0 days.

(21) Appl. No.: 14/080,100

(22) Filed: Nov. 14, 2013

(65) Prior Publication Data

US 2015/0133263 A1 May 14, 2015

(51) Int. Cl.
*B60K 1/02* (2006.01)
*B60W 10/08* (2006.01)
*B60W 10/119* (2012.01)

(52) U.S. Cl.
CPC .............. *B60K 1/02* (2013.01); *B60W 10/08* (2013.01); *B60W 10/119* (2013.01)

(58) Field of Classification Search
CPC ....................................................... B60K 1/02
USPC .................... 475/5, 9, 150, 153, 230
See application file for complete search history.

(56) References Cited

U.S. PATENT DOCUMENTS

| | | | | |
|---|---|---|---|---|
| 3,455,407 A | * | 7/1969 | Phillips | 180/248 |
| 5,356,350 A | * | 10/1994 | Schreiber | 475/153 |
| 5,996,720 A | * | 12/1999 | Hunt | 180/247 |
| 8,663,051 B2 | * | 3/2014 | Sten | 475/205 |
| 2003/0125150 A1 | * | 7/2003 | Tanzer | 475/150 |
| 2006/0213706 A1 | | 9/2006 | Gouda et al. | |
| 2007/0051847 A1 | * | 3/2007 | Quitmeyer et al. | 244/99.2 |

FOREIGN PATENT DOCUMENTS

| | | |
|---|---|---|
| DE | 102010015310 A1 | 10/2011 |
| FR | 2928583 A1 | 9/2009 |
| JP | EP1354744 A2 | 10/2003 |
| WO | WO2010053745 A1 | 5/2010 |
| WO | WO2011076487 | 6/2011 |
| WO | WO2014011230 A1 | 1/2014 |

OTHER PUBLICATIONS

Partial European Search Report, Feb. 20, 2014, 7 pages.

* cited by examiner

*Primary Examiner* — Edwin A Young
(74) *Attorney, Agent, or Firm* — Stetina Brunda Garred & Brucker

(57) ABSTRACT

Provided is a driving device for rear wheels of a 4 wheel driving electric vehicle, which can minimize a loss in the drive power during 4-wheel by transmitting the drive power to the rear wheels based on a disconnector input shaft, rather than a clutch, after synchronizing a rotating speed of the disconnector input shaft based on a first motor with a rotating speed of a hub based on rear wheels. Other aspects of the present invention provide a driving device for rear wheels of a 4 wheel driving electric vehicle, which can prevent a loss in the drive power during 2-wheel driving by preventing a load based on a differential device from being generated by connecting the differential device between a reduction gear group and the disconnector input shaft.

7 Claims, 2 Drawing Sheets

DRIVING DEVICE FOR REAR WHEELS OF FOUR WHEEL DRIVING ELECTRIC VEHICLE

BACKGROUND OF THE INVENTION

1. Field of the Invention

Aspects of the present invention relate to a driving device for rear wheels of a 4 wheel driving electric vehicle. More particularly, aspects of the present invention relate to a driving device for rear wheels of a 4 wheel driving electric vehicle, which can minimize a loss in the drive power during 4-wheel driving by transmitting the drive power to the rear wheels based on a disconnector input shaft, rather than a clutch, after synchronizing a rotating speed of the disconnector input shaft based on a first motor with a rotating speed of a hub based on rear wheels, and can prevent a loss in the drive power during 2-wheel driving by preventing a load based on a differential device from being generated by connecting the differential device between a reduction gear group and the disconnector input shaft.

2. Description of the Related Art

In general, a 4-wheel drive vehicle may be divided into a 2-wheel drive mode and a 4-wheel drive mode according to the drive mode.

A 2-wheel drive vehicle will first be described. The 2-wheel drive vehicle is classified as a rear engine rear drive (RR) system, a front engine front drive (FF) system, or a front engine rear drive (FR) system according to actual driven wheels in the engine and transmission layouts.

Since the RR system is usually applied to only sports cars, rather than general passenger cars or sport utility vehicles (SUVs), the 2-wheel drive vehicle may be largely divided into the FF system and the FR system mode.

The FF vehicle and the FR vehicle are the same with each other in that their engines and transmissions are installed on the front sides of the vehicles, while having different layouts. That is to say, the FF vehicle is usually configured such that its engine and transmission are installed on a lateral side of the vehicle to transfer power to front wheels through a differential unit integrally formed with the transmission. The FR vehicle is generally configured such that its engine and transmission are arranged in a front-back direction of the vehicle to transfer power from the transmission to rear wheels through a propeller shaft.

Next, a 4-wheel drive vehicle will now be described. In order to supply 4 wheels with an appropriate amount of drive power of an engine, the 4-wheel drive vehicle employs a clutch, a transmission device and a differential device. The 4-wheel drive vehicle is divided into a part time 4-wheel drive vehicle and a full time 4-wheel drive vehicle according to the transmission method of the transmission. In the part time 4-wheel drive vehicle, power transferred to front wheels is manually switched. In the full time 4-wheel drive vehicle, 4 wheels are constantly driven.

In the 4-wheel drive vehicle, the power transferred from the engine is distributed to front and rear wheels. As shown in FIG. 1, electric vehicles, including a hybrid vehicle, generally use the drive power generated from a separate motor (M) driven by a battery (B), rather than the drive power generated from an engine (E) and transferred to rear wheels. The drive power generated from the engine (E) is transferred to a transmission (TM) to then be applied to front wheels through a differential device (D).

FIG. 2 is a perspective view of a conventional driving device for rear wheels of the conventional 4 wheel driving electric vehicle shown in FIG. 1.

As shown in FIG. 2, the conventional driving device includes a motor 1 generating rotational power to drive a vehicle, a first drive gear 2 connected to a rotation shaft of the motor 1, a first driven gear 3 meshed with the first drive gear 2, a second drive gear 4 coaxially coupled to the first driven gear 3, a second driven gear 5 meshed with the second drive gear 4, a clutch 6 coaxially coupled to the second driven gear 5 and transferring or blocking drive power, and a differential gear 7 connected to the clutch 6 to transfer the drive power to both wheels.

With this configuration, the conventional driving device operates as follows. When the motor 1 is driven, the power generated from the motor 1 is transferred to the first drive gear 2 and is primarily decelerated by the first driven gear 3 meshed with the first drive gear 2.

The power primarily decelerated by the first driven gear 3 is transferred to the second drive gear 4 coaxially coupled to the first driven gear 3 and is secondarily decelerated by the second driven gear 5 meshed with the second drive gear 4.

The power secondarily decelerated by the second driven gear 5 is coaxially coupled to the second driven gear 5 to then be transferred to the clutch 6 transferring or blocking drive power. The front wheels of the vehicle are driven by the power generated from a front wheel drive motor (not shown) or an engine (not shown) and the vehicle runs. Then, if the power is transferred by the clutch 6 for 4-wheel driving, the power is transferred to both rear wheels by the differential gear 7 connected to the clutch 6, thereby achieving the 4-wheel driving.

In the conventional driving device, however, since the power is transferred using a clutch, a loss in the drive power may be generated due to a slip between friction plates in the clutch.

In addition, in the conventional driving device, since a differential gear is connected between the clutch and rear wheels, a load derived from the differential gear may be generated during 2-wheel driving using front wheels, resulting in a loss in the drive power.

BRIEF SUMMARY OF THE INVENTION

Aspects of the present invention provide a driving device for rear wheels of a 4 wheel driving electric vehicle, which can minimize a loss in the drive power during 4-wheel driving by transmitting the drive power to the rear wheels based on a disconnector input shaft, rather than a clutch, after synchronizing a rotating speed of the disconnector input shaft based on a first motor with a rotating speed of a hub based on rear wheels.

Other aspects of the present invention provide a driving device for rear wheels of a 4 wheel driving electric vehicle, which can prevent a loss in the drive power during 2-wheel driving by preventing a load based on a differential device from being generated by connecting the differential device between a reduction gear group and the disconnector input shaft.

In accordance with one aspect of the present invention, there is provided a driving device for rear wheels of a 4 wheel driving electric vehicle, the driving device including a first motor for generating rotational power; a motor inner shaft installed within the first motor while passing through the first motor and having one end connected to the rear wheels; a reduction gear group connected to the first motor; a differential device including a right differential gear connected to the motor inner shaft and a differential case connected to the reduction gear group; a disconnector input shaft having one end connected to a left differential gear of the differential device and the other end connected to or disconnected from a hub; a wheel speed sensor sensing a wheel rotating speed; a controller outputting a signal for connecting the disconnector input shaft to the hub; a motor driver connected to the controller; a second motor connected to the motor driver; a shift fork connected to the second motor; and a sleeve connected to the shift fork and connecting/disconnecting the disconnector input shaft and the hub to/from each other.

The reduction gear group may include a first drive gear connected to the first motor, a first driven gear meshed with the first drive gear, a second drive gear coaxially connected to a rotation shaft of the first driven gear, and a second driven gear meshed between the second drive gear and the differential case.

The second motor may be a linear motor.

The controller controls revolutions per minute (RPM) of the first motor by comparing a wheel rotating speed input through the wheel speed sensor with a motor rotating speed input from an internal sensor of the first motor, thereby synchronizing the rotating speed of the disconnector input shaft based on the first motor with the rotating speed of the hub based on the rear wheels.

After the hub and the disconnector input shaft are connected to each other, the controller may switch a mode of the first motor from RPM control to torque control.

After the hub and the disconnector input shaft are connected to each other, the rotational power of the motor inner shaft based on the first motor may be directly transmitted to the disconnector input shaft through differential gears of the differential device.

The second driven gear may be a ring gear.

As described above, according to the present invention, a loss in the drive power can be minimized during 4-wheel driving by transmitting the drive power to the rear wheels based on a disconnector input shaft, rather than a clutch, after synchronizing a rotating speed of the disconnector input shaft based on a first motor with a rotating speed of a hub based on rear wheels.

In addition, a loss in the drive power can be prevented during 2-wheel driving by preventing a load based on a differential device from being generated by connecting the differential device between a reduction gear group and the disconnector input shaft.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Hereinafter, examples of embodiments of the invention will be described in detail with reference to the accompanying drawings such that they can easily be made and used by those skilled in the art. Advantages and features of the present invention and methods of accomplishing the same may be understood more readily by reference to the following detailed description of preferred embodiments and the accompanying drawings.

The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In addition, it will be understood that terms, such as those defined in commonly used dictionaries, should not be limited to normal dictionary meanings but should be interpreted as having a meaning that is consistent with their meaning in the context of the relevant art and the present disclosure based on the principle that the inventor can define appropriately concepts of terms to best describe the invention.

Figure 1:
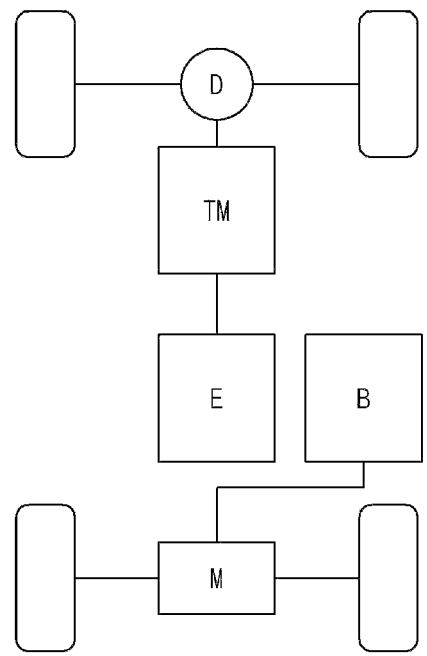
FIG. 1 is a schematic diagram of a conventional 4-wheel drive electric vehicle.
Figure 2:
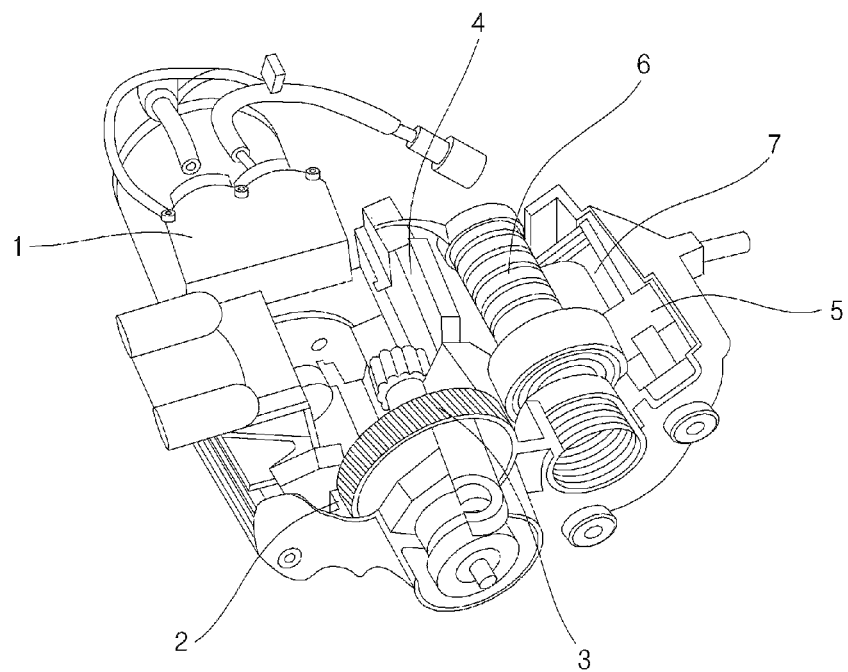
FIG. 2 is a perspective view of a conventional driving device for rear wheels of the conventional 4 wheel driving electric vehicle shown in FIG. 1.
Figure 3:
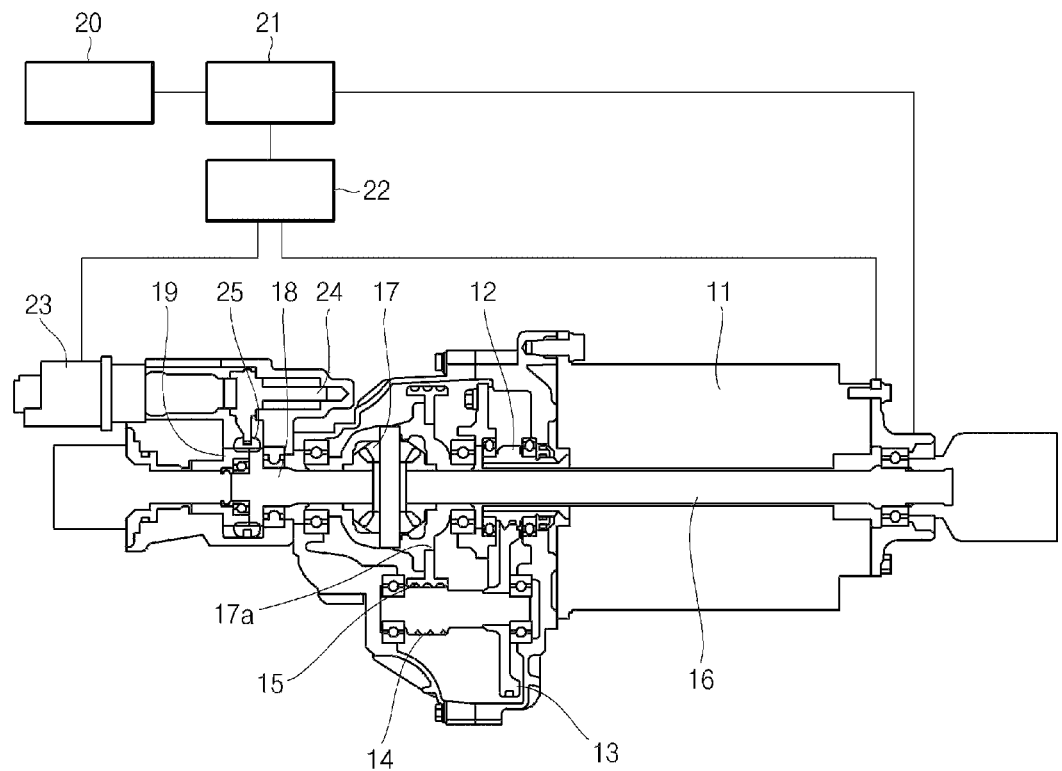
FIG. 3 is a cross-sectional view of a driving device for rear wheels of a 4 wheel driving electric vehicle according to an embodiment of the present invention.
Figure 4:
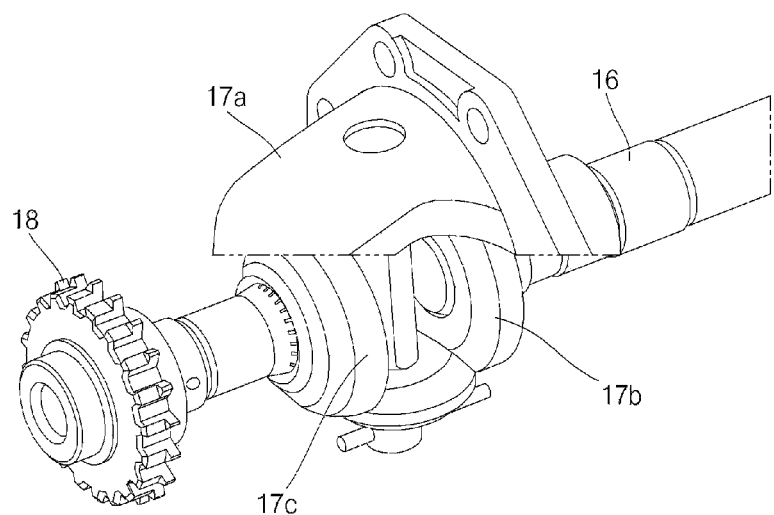
FIG. 4 is a diagram illustrating connection between a driving device for rear wheels and a differential device in the 4 wheel driving electric vehicle shown in FIG. 3.

FIG. 3 is a cross-sectional view of a driving device for rear wheels of a 4 wheel driving electric vehicle according to an embodiment of the present invention, and FIG. 4 is a diagram illustrating connection between a driving device for rear wheels and a differential device in the 4 wheel driving electric vehicle shown in FIG. 3.

As shown in FIGS. 3 and 4, the driving device for rear wheels of a 4 wheel driving electric vehicle according to the embodiment of the present invention includes a first motor 11 for generating rotational power, a motor inner shaft 16 installed within the first motor 11 while passing through the first motor 11 and having one end connected to the rear wheels, a first drive gear 12 connected to the first motor 11, a first driven gear 13 meshed with the first drive gear 12, a second drive gear 14 coaxially coupled to a rotation shaft of the first driven gear 13, a second driven gear 15 meshed with the second drive gear 14, a differential device 17 including a right differential gear 17b connected to the motor inner shaft 16 and a differential case 17a connected to the second driven gear 15, a disconnector input shaft 18 having one end connected to a left differential gear 17c of the differential device 17 and the other end connected to or disconnected from a hub 19, a wheel speed sensor 20 sensing a wheel rotating speed, a controller 21 outputting a signal for connecting the disconnector input shaft 18 to the hub 19 to drive the rear wheels after synchronizing the rotating speed of the disconnector input shaft 18 based on the first motor 11 with the rotating speed of the hub 19 based on the rear wheels, a motor driver 22 connected to the controller 21, a second motor 23 connected to the motor driver 22, a shift fork 24 connected to the second motor 23, and a sleeve 25 connected to the shift fork 24 and connecting/disconnecting the disconnector input shaft 18 and the hub 19 to/from each other.

The second motor 23 may include a linear motor.

The second driven gear 15 may include a ring gear.

With this configuration, the driving device for rear wheels of a 4 wheel driving electric vehicle according to the embodiment of the present invention operates as follows.

When the 4-wheel drive electric vehicle is driven only by front wheels, that is, when the rear wheels operate as driven wheels, the sleeve 25 does not connect the hub 19 and the disconnector input shaft 18 to each other, thereby preventing the rotational power of the disconnector input shaft 18 from being transferred to the hub 19. Accordingly, a loss in the drive power due to resistance derived from the first motor 11 and the reduction gear group 12, 13, 14 and 15 and the differential device 17 can be prevented, thereby improving a fuel consumption ratio.

In a case where rear wheels are to be driven for 4-wheel driving, that is, in a case where the rear wheels operate as drive wheels, the controller 21 drives the first motor 11 through the motor driver 22. If the first motor 11 is driven in such a manner, the rotational power of the first motor 11 is decelerated through the first drive gear 12, the first driven gear 13, the second drive gear 14 and the second driven gear 15 to then rotate a differential case of the differential device 17, thereby rotating the disconnector input shaft 18. Next, the controller 21 controls revolutions per minute (RPM) of the first motor 11 by comparing a rear wheel rotating speed input through the wheel speed sensor 20 with a motor rotating speed input from an internal sensor of the first motor 11, thereby synchronizing the rotating speed of the disconnector input shaft 18 based on the first motor 11 with the rotating speed of the hub 19 based on the rear wheels.

If the rotating speed of the disconnector input shaft 18 based on the first motor 11 with the rotating speed of the hub 19 based on the rear wheels by controlling the RPM of the first motor 11, the controller 21 drives the second motor 23 to allow the sleeve 25 to slightly move to the disconnector input shaft 18 by the shift fork 24 to connect the hub 19 and the disconnector input shaft 18 to each other, thereby transferring the rotating power of the disconnector input shaft 18 to the hub 19.

After the hub 19 and the disconnector input shaft 18 are connected to each other in such a manner, the controller 21 switches a control mode of the first motor 11 from RPM control to torque control. From a viewpoint of the torque-controlled differential device 17, there is no speed difference between the right differential gear 17b and the left differential gear 17c. Thus, the rotating power of the motor inner shaft 16 based on the first motor 11 is transferred to the rear wheels and is directly transferred to the disconnector input shaft 18 through the differential gears 17b and 17c of the differential device 17 to then be transferred to the hub 19, thereby driving the rear wheels.

As described above, during 4-wheel driving, after the rotating speed of the disconnector input shaft 18 based on the first motor 11 and the rotating speed of the hub 19 based on the rear wheels are synchronized, the drive power is transferred to the rear wheels using the disconnector input shaft 18, rather than the clutch, thereby minimizing a loss in the drive power.

While the invention has been described in connection with a certain exemplary embodiment, it will be understood by those skilled in the art that the invention is not limited to the disclosed embodiments, but rather is intended to cover various modifications included within the spirit and scope of the appended claims and equivalents thereof.

What is claimed is:

1. A driving device for rear wheels of a 4 wheel driving electric vehicle, the driving device comprising:
    a first motor for generating rotational power;
    a motor inner shaft installed within the first motor while passing through the first motor and having one end connected to the rear wheels;
    a reduction gear group connected to the first motor;
    a differential device including a right differential gear connected to the motor inner shaft and a differential case connected to the reduction gear group;
    a disconnector input shaft having one end connected to a left differential gear of the differential device and the other end connected to or disconnected from a hub;
    a wheel speed sensor sensing a wheel rotating speed;
    a controller outputting a signal for connecting the disconnector input shaft to the hub;
    a motor driver connected to the controller;
    a second motor connected to the motor driver;
    a shift fork connected to the second motor; and
    a sleeve connected to the shift fork and connecting/disconnecting the disconnector input shaft and the hub to/from each other.

2. The driving device of claim 1, wherein the reduction gear group includes a first drive gear connected to the first motor, a first driven gear meshed with the first drive gear, a second drive gear coaxially connected to a rotation shaft of the first driven gear, and a second driven gear meshed between the second drive gear and the differential case.

3. The driving device of claim 2, wherein the second driven gear is a ring gear.

4. The driving device of claim 1, wherein the second motor is a linear motor.

5. The driving device of claim 1, wherein the controller controls revolutions per minute (RPM) of the first motor by comparing a wheel rotating speed input through the wheel speed sensor with a motor rotating speed input from an internal sensor of the first motor, thereby synchronizing the rotating speed of the disconnector input shaft based on the first motor with the rotating speed of the hub based on the rear wheels.

6. The driving device of claim 1, wherein after the hub and the disconnector input shaft are connected to each other, the controller switches a mode of the first motor from RPM control to torque control.

7. The driving device of claim 1, wherein after the hub and the disconnector input shaft are connected to each other, the rotational power of the motor inner shaft based on the first motor is directly transmitted to the disconnector input shaft through differential gears of the differential device.

* * * * *